(12) United States Patent
Nishiumi (10) Patent No.: US 8,256,281 B2
(45) Date of Patent: Sep. 4, 2012

(54) FUEL PROPERTY DETERMINATION APPARATUS FOR INTERNAL COMBUSTION ENGINE

(75) Inventor: Ryoji Nishiumi, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 386 days.

(21) Appl. No.: 12/678,075

(22) PCT Filed: Feb. 23, 2009

(86) PCT No.: PCT/JP2009/053201
§ 371 (c)(1),
(2), (4) Date: Mar. 12, 2010

(87) PCT Pub. No.: WO2010/095262
PCT Pub. Date: Aug. 26, 2010

(65) Prior Publication Data
US 2011/0214495 A1 Sep. 8, 2011

(51) Int. Cl.
*G01M 15/04* (2006.01)
(52) U.S. Cl. .................................................. 73/114.49
(58) Field of Classification Search ............... 73/35.02, 73/114.38, 114.49
See application file for complete search history.

(56) References Cited

U.S. PATENT DOCUMENTS

| | | | |
|---|---|---|---|
| 6,941,929 B2 * | 9/2005 | Shinzawa | 123/357 |
| 7,028,532 B2 * | 4/2006 | Shinzawa | 73/35.02 |
| 7,421,884 B2 | 9/2008 | Aoyama | |
| 7,617,038 B2 * | 11/2009 | Yamaguchi et al. | 701/103 |
| 7,621,174 B2 * | 11/2009 | Takaku | 73/114.53 |
| 2004/0154386 A1 | 8/2004 | Shinzawa | |
| 2004/0154591 A1 * | 8/2004 | Shinzawa | 123/406.47 |
| 2007/0204674 A1 * | 9/2007 | Takaku | 73/35.02 |

FOREIGN PATENT DOCUMENTS

| | | |
|---|---|---|
| JP | 11-107820 A | 4/1999 |
| JP | 2004-044513 A | 2/2004 |
| JP | 2004-239229 A | 8/2004 |
| JP | 2005-344557 A | 12/2005 |

* cited by examiner

*Primary Examiner* — Freddie Kirkland, III
(74) *Attorney, Agent, or Firm* — Sughrue Mion, PLLC (57) ABSTRACT

An object of the present invention is to determine individually and accurately an ignitability index value and an evaporativity index value of a fuel.

A fuel injection valve (12) for which a fuel injection direction is set such that fuel is directed toward a cylinder wall surface (54) is included. An air-fuel ratio (a first air-fuel ratio) of an exhaust gas and a crank angular velocity (a first crank angular velocity) during combustion associated with fuel injection at a first after injection timing T1 are acquired. An air-fuel ratio (a second air-fuel ratio) of the exhaust gas and a crank angular velocity (a second crank angular velocity) during combustion associated with fuel injection at a second after injection timing T2 that is retarded from the first after injection timing T1 are acquired. A cetane number and a distillation property are determined based on Δ A/F that is an amount of change between the first air-fuel ratio and the second air-fuel ratio, Δ crank angular velocity that is an amount of change between the first crank angular velocity and the second crank angular velocity, and predetermined determination basic information.

8 Claims, 7 Drawing Sheets

FUEL PROPERTY DETERMINATION APPARATUS FOR INTERNAL COMBUSTION ENGINE

TECHNICAL FIELD

The present invention relates to fuel property determination apparatuses for internal combustion engines that determine properties of fuels used in internal combustion engines. More particularly, the present invention relates to a fuel property determination apparatus suitable for determining properties of a fuel used in a compression ignition internal combustion engine.

BACKGROUND ART

A known combustion control apparatus for a diesel engine is disclosed, for example, in Patent Document 1. The known control apparatus uses a cylinder pressure sensor to detect ignition timing of fuel. Fuel injection timing, an EGR ratio, or the like is then corrected based on a difference between an actual ignition timing detected and a target value. A technique of such a known control apparatus can control combustion of the diesel engine, while inhibiting negative effects associated with a change in a cetane number as an ignitability index value of fuels.

Including the above-referenced document, the applicant is aware of the following documents as a related art of the present invention.

[Patent Document 1] Japanese Laid-open Patent Application Publication No. Hei 11-107820
[Patent Document 2] Japanese Laid-open Patent Application Publication No. 2004-239229

DISCLOSURE OF THE INVENTION

Problem to be Solved by the Invention

Combustion of the compression ignition internal combustion engine is significantly affected by a distillation property (evaporativity index value) of the fuel, in addition to the cetane number (ignitability index value) that is taken into consideration by the above-described known control apparatus. It is therefore desirable that the ignitability index value and the evaporativity index value be determined individually. The above-described known technique is not, however, adapted to be able to determine individually the ignitability index value and the evaporativity index value.

The present invention has been made to solve the foregoing problem and it is an object of the present invention to provide a fuel property determination apparatus for an internal combustion engine that can accurately determine individually the ignitability index value and the evaporativity index value of fuels.

Means for Solving the Problem

A first aspect of the present invention is a fuel property determination apparatus for an internal combustion engine, the apparatus comprising:
a fuel injection valve for injecting fuel into a cylinder;
first injection execution means for executing fuel injection using the fuel injection valve at a first injection timing during an expansion stroke;
second injection execution means for executing fuel injection using the fuel injection valve at at least one second injection timing during the expansion stroke, the second injection timing being retarded from the first injection timing, while a combustion cycle proceeds unlike that when the fuel injection at the first injection timing is performed;
combustion pressure acquisition means for detecting or estimating a combustion pressure or a correlation value thereof;
air-fuel ratio acquisition means for acquiring an air-fuel ratio of an exhaust gas; and
fuel property determination means for determining a fuel property based on a combustion pressure during combustion each associated with the fuel injection at the first injection timing and the second injection timing or a correlation value thereof, and an air-fuel ratio of an exhaust gas during combustion each associated with the fuel injection at the first injection timing and the second injection timing.

A second aspect of the present invention is the fuel property determination apparatus for the internal combustion engine according to the first aspect of the present invention,
wherein the fuel property determination means includes:
first determination index calculation means for calculating, as a first determination index, information on a change of the combustion pressure during combustion associated with the fuel injection at the second injection timing or the correlation value thereof relative to the combustion pressure during combustion associated with the fuel injection at the first injection timing or the correlation value thereof;
second determination index calculation means for calculating, as a second determination index, information on a change of the air-fuel ratio during combustion associated with the fuel injection at the second injection timing relative to the air-fuel ratio during combustion associated with the fuel injection at the first injection timing;
determination basic information acquisition means for acquiring determination basic information that specifies a fuel ignitability index value and a fuel evaporativity index value using the first determination index and the second determination index; and
determination execution means for determining the ignitability index value and the evaporativity index value according to the first determination index, the second determination index, and the determination basic information.

A third aspect of the present invention is the fuel property determination apparatus for the internal combustion engine according to the second aspect of the present invention,
wherein the first determination index is a change amount of the combustion pressure during combustion associated with the fuel injection at the second injection timing or the correlation value thereof relative to the combustion pressure during combustion associated with the fuel injection at the first injection timing or the correlation value thereof;
wherein the second determination index is a change amount of the air-fuel ratio during combustion associated with the fuel injection at the second injection timing relative to the air-fuel ratio during combustion associated with the fuel injection at the first injection timing; and
wherein the determination basic information is set such that, the greater the first determination index, the lower the ignitability indicated by the ignitability index value, and the greater the second determination index, the lower the evaporativity indicated by the evaporativity index value.

A fourth aspect of the present invention is the fuel property determination apparatus for the internal combustion engine according to any one of the first to third aspects of the present invention, the apparatus further comprising:
second injection timing setting means for setting the second injection timing based on at least one of the combustion pressure during combustion associated with the fuel injection at the first injection timing and the correlation value thereof, or the air-fuel ratio during combustion associated with the fuel injection at the first injection timing.

A fifth aspect of the present invention is the fuel property determination apparatus for the internal combustion engine according to the fourth aspect of the present invention, wherein the second injection timing setting means makes a setting such that the leaner a value of the air-fuel ratio during combustion associated with the fuel injection at the first injection timing, the smaller a retard amount of the second injection timing relative to the first injection timing.

A sixth aspect of the present invention is the fuel property determination apparatus for the internal combustion engine according to the fourth aspect of the present invention, wherein the second injection timing setting means makes a setting such that the smaller the combustion pressure during combustion associated with the fuel injection at the first injection timing or the correlation value thereof, the smaller a retard amount of the second injection timing relative to the first injection timing.

A seventh aspect of the present invention is the fuel property determination apparatus for the internal combustion engine according to any one of the first to sixth aspects of the present invention, wherein the correlation value of the combustion pressure is a measured value of a crank angular velocity.

Advantages of the Invention

A bore flushing amount and a combustion rate of fuel when the injection is executed during an expansion stroke vary depending on the ignitability index value and the evaporativity index value of fuel. In addition, the ignitability index value of fuel greatly affects the combustion pressure and the evaporativity index value greatly affects the air-fuel ratio of the exhaust gas. According to the first aspect of the present invention, properties of the fuel are determined based on the combustion pressure and the air-fuel ratio at different injection timings during combustion (combustion in the expansion stroke) which is easily affected by the ignitability and evaporativity of the fuel. This allows the ignitability index value and the evaporativity index value of the fuel to be determined individually and with high accuracy.

First determination information that is the information on the change of the combustion pressure or the correlation value thereof largely reflects an effect from the ignitability index value of the fuel. Second determination information that is the information on the change of the air-fuel ratio of the exhaust gas largely reflects an effect from the evaporativity index value of the fuel. According to the second aspect of the present invention, determination is made using the determination basic information that specifies the fuel ignitability index value and the fuel evaporativity index value using the first determination index and the second determination index. The ignitability index value and the evaporativity index value of the fuel can thereby be determined individually and with high accuracy.

According to the third aspect of the present invention, the ignitability index value and the evaporativity index value can be determined individually and with high accuracy by using the determination basic information that is set such that the greater the first determination index, the lower the ignitability indicated by the ignitability index value, and the greater the second determination index, the lower the evaporativity indicated by the evaporativity index value.

According to the fourth aspect of the present invention, a magnitude of the determination index (the first determination index and the second determination index) required for ensuring accuracy in determining the fuel property can be sufficiently achieved, while inhibiting the bore flushing amount.

If the air-fuel ratio during combustion associated with the fuel injection at the first after injection timing is lean, it can be determined that a fuel with which bore flushing tends more easily to occur is being used. It can therefore be determined that the amount of change in the air-fuel ratio becomes greater as the after injection timing is retarded more. According to the fifth aspect of the present invention, the retard amount of the second after injection timing relative to the first after injection timing is made small in such a case. This prevents the second after injection timing from being uselessly retarded, thereby inhibiting the bore flushing amount and achieving sufficiently large second determination information required for ensuring accuracy in determining the fuel property.

If the combustion pressure during combustion associated with the fuel injection at the first after injection timing or the correlation value thereof is small, it can be determined that a fuel with which bore flushing tends more easily to occur is being used. It can therefore be determined that the amount of change in the combustion pressure or the correlation value thereof becomes greater as the after injection timing is retarded more. According to the sixth aspect of the present invention, the retard amount of the second after injection timing relative to the first after injection timing is made small in such a case. This prevents the second after injection timing from being uselessly retarded, thereby inhibiting the bore flushing amount and achieving sufficiently large first determination information required for ensuring accuracy in determining the fuel property.

According to the seventh aspect of the present invention, the correlation value of the combustion pressure can be obtained based on the measured value of the crank angular velocity.

DESCRIPTION OF SYMBOLS

10 internal combustion engine
12 fuel injection valve 14 common rail
16 supply pump
18 intake path
32 exhaust path
38 air-fuel ratio sensor
40 ECU (Electronic Control Unit)
44 crank angle sensor
46 intake valve
48 exhaust valve
50 combustion chamber
52 piston
52a cavity
54 cylinder wall surface

BEST MODE FOR CARRYING OUT THE INVENTION

First Embodiment

[Description of System Arrangements]

Figure 1:
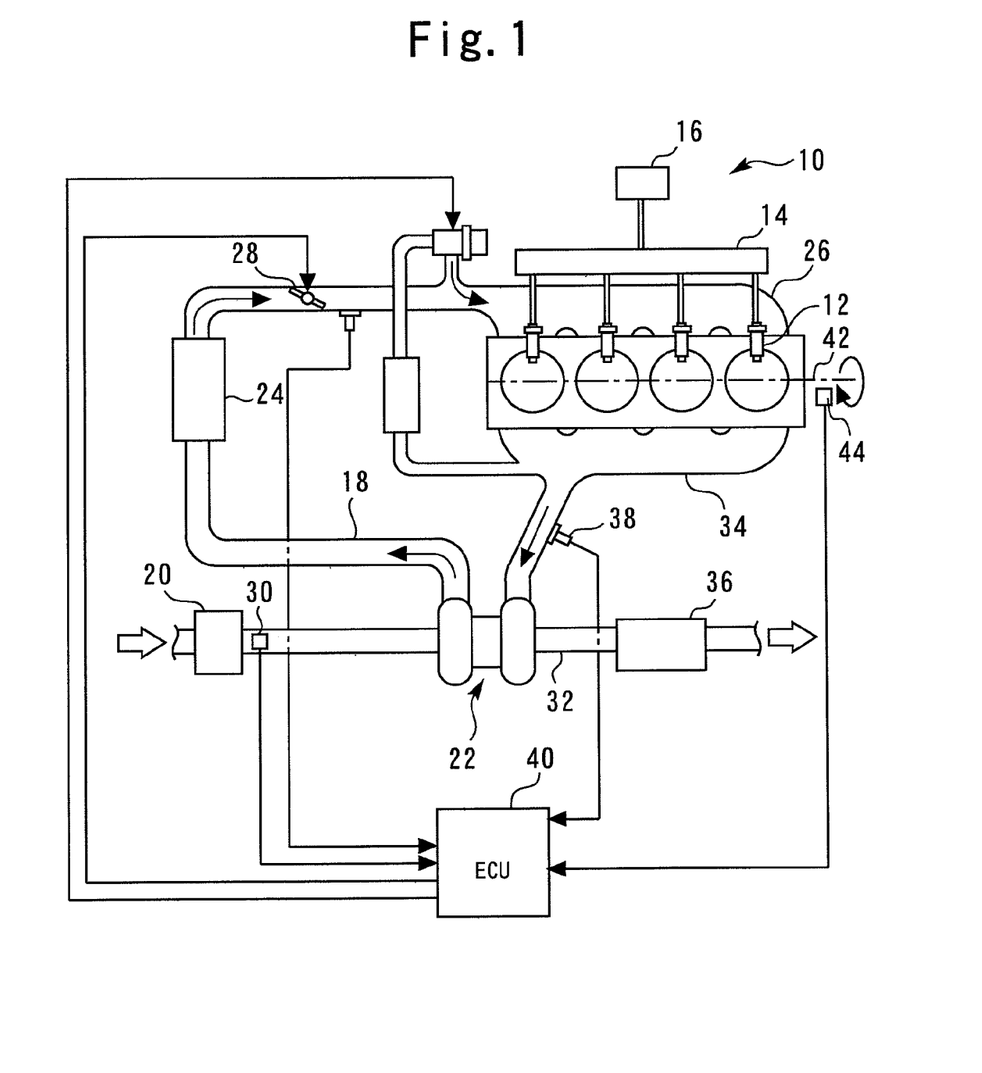
FIG. 1 is a diagram for explaining arrangements of a system according to a first embodiment of the present invention.

FIG. 1 is a diagram for explaining arrangements of a system according to a first embodiment of the present invention. The system shown in FIG. 1 includes an internal combustion engine 10. The internal combustion engine 10 is a four-cycle diesel engine (compression ignition internal combustion engine). The internal combustion engine 10 includes cylinders, each including a fuel injection valve 12 disposed therein. The fuel injection valve 12 directly injects fuel into each cylinder. The fuel injection valve 12 of each cylinder is connected to a common common rail 14. Fuel in a fuel tank which is not shown is pressurized to a predetermined fuel pressure by a supply pump 16, accumulated in the common rail 14, and supplied to each fuel injection valve 12 from the common rail 14.

An air cleaner 20 is disposed near an entrance of an intake path 18 of the internal combustion engine 10. Air suctioned through the air cleaner 20 is compressed by a compressor of a turbocharger 22 before being cooled by an intercooler 24. The intake air that has flowed through the intercooler 24 is distributed to an intake port of each cylinder by an intake manifold 26.

An intake throttle valve 28 is disposed between the intercooler 24 and the intake manifold 26. In addition, an air flow meter 30 that detects an intake air amount is disposed near downstream of the air cleaner 20.

An exhaust path 32 of the internal combustion engine 10 is branched out by an exhaust manifold 34 and connected to an exhaust port of each cylinder. The exhaust path 32 includes a turbine of the turbocharger 22 disposed therein. The exhaust path 32 further includes an exhaust purification device 36 disposed downstream of the turbocharger 22 in the exhaust path 32. The exhaust purification device 36 purifies an exhaust gas. In addition, the exhaust path 32 further includes an air-fuel ratio sensor 38 disposed at an upstream portion of the exhaust purification device 36 in the exhaust path 32. The air-fuel ratio sensor 38 detects an air-fuel ratio (A/F) of the exhaust gas flowing through the portion in question.

Additionally, the system of the present embodiment includes an ECU (electronic control unit) 40. The ECU 40 is connected with various types of sensors for detecting an operating state of the internal combustion engine 10. These sensors include a crank angle sensor 44 for detecting a rotation angle (crank angle) and a rotation speed (crank angular velocity) of a crankshaft 42, in addition to the above-described sensors. Additionally, the ECU 40 is connected with various types of actuators for controlling the operating state of the internal combustion engine 10, in addition to the various types of actuators described earlier. Based on signals or information from these sensors, the ECU 40 drives each actuator according to predetermined programs to thereby control the operating state of the internal combustion engine 10.

Figure 2:
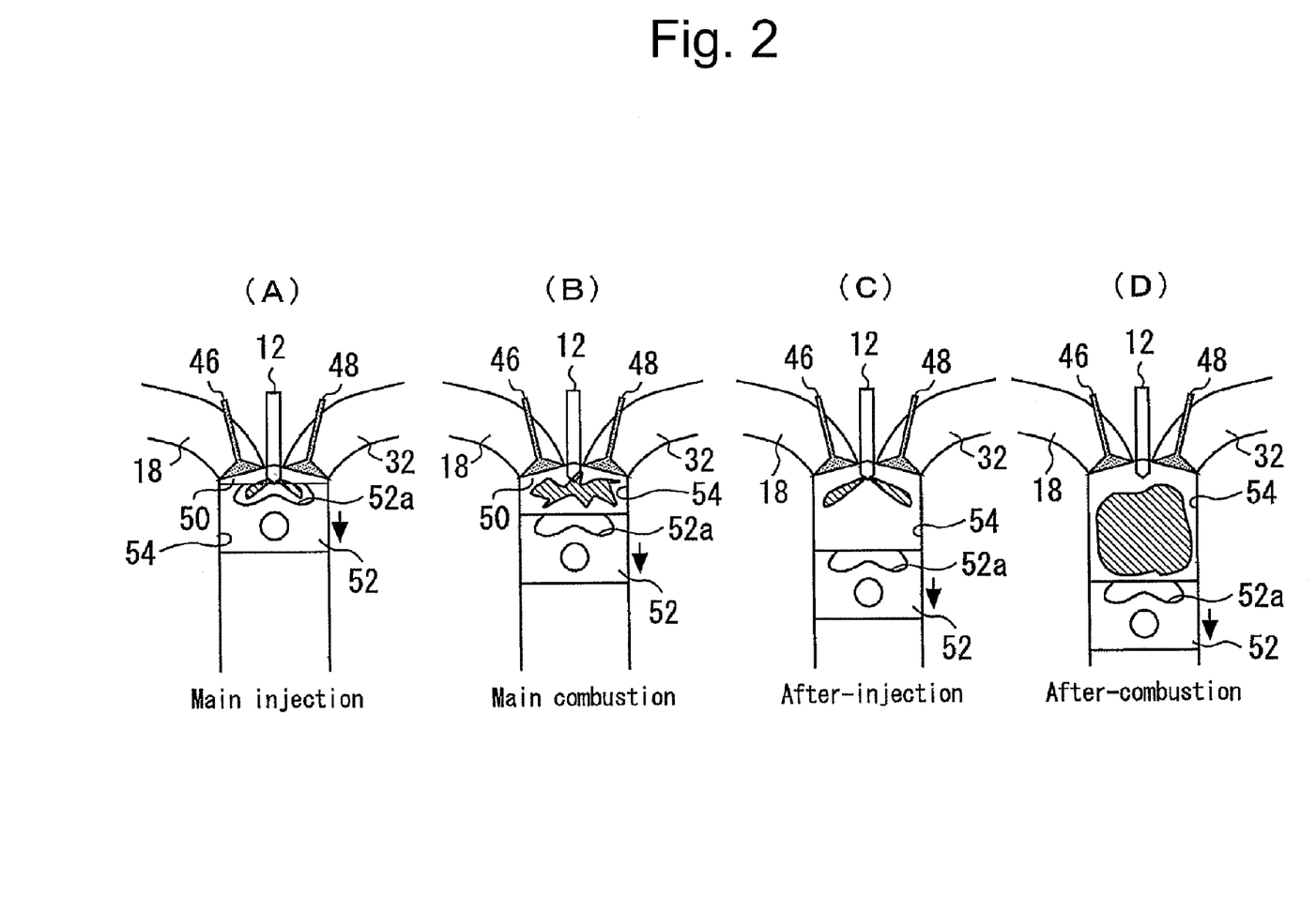
FIG. 2 is a diagram for explaining modes of fuel injection and combustion carried out in the internal combustion engine shown in FIG. 1, and setting of an injection angle of the fuel injection valve.

FIG. 2 is a diagram for explaining modes of fuel injection and combustion carried out in the internal combustion engine 10 shown in FIG. 1, and setting of an injection angle of the fuel injection valve 12.

As shown in FIG. 2, the above-described fuel injection valve 12 is disposed at a position between an intake valve 46 and an exhaust valve 48 so as to have a leading end thereof protruding at a central portion of a combustion chamber 50. Additionally, a piston 52 disposed in the cylinder has a top face that includes a cavity 52a formed therein. The cavity 52a guides injected fuel.

A main injection that serves as a fuel injection for obtaining torque of the internal combustion engine 10 is performed when the piston 52 is positioned near a top dead center on a compression stroke as shown in FIG. 2(A). The fuel injection angle of the fuel injection valve 12 and the shape of the cavity 52a are set such that fuel injected during the main injection is properly introduced into the cavity 52a when the piston 52 is positioned near the top dead center. According to such a setting of the injection angle, part of the injected fuel tends more easily to adhere to an exposed cylinder wall surface 54, if the fuel injection is executed under a condition in which the piston 52 leaves the top dead center to be lowering as shown in FIG. 2(C).

Further, the above-described main injection is executed near the top dead center on the compression stroke, in which in-cylinder gas is hot. This allows the injected fuel to vaporize and be mixed with air. As a result, the main combustion is made as shown in FIG. 2(B).

Additionally, in this embodiment, an after-injection with an aim, for example, of increasing an exhaust temperature is executed. The after-injection is executed during an expansion stroke before the exhaust valve 48 opens following the main combustion as shown in FIG. 2(C). In the expansion stroke following the main combustion, the temperature and pressure in cylinders decrease as a downward motion of the piston 52 progresses. Because of this, a less combustible condition develops as timing to execute the after-injection is retarded. Consequently, the after-injection with the aim, for example, of increasing the exhaust temperature is executed during a period in which combustion is possible after the main combustion. As a result, the injected fuel vaporizes and is mixed with air, so that the after-combustion can be made as shown in FIG. 2(D).

[Fuel Property Determination Technique in the First Embodiment]

In internal combustion engines, fuel properties greatly affect combustion and catalysts. An expanded use of synthetic fuels, biofuels, or other types of fuels results in a wider range in cetane number (ignitability index value representing ease with which fuel can be ignited) or distillation property (evaporativity index value representing ease with which fuel evaporates) of the fuel to be used. As a result, it becomes all the more important to determine accurately properties of fuel. A technique for individually determining the distillation property and the cetane number of fuel will be described. The technique uses, in accordance with the present embodiment, the fact that evaporation and combustion of fuel when the above-described after-injection is executed are easily affected by the distillation property and cetane number of the fuel.

A bore flushing amount and a combustion rate of fuel when the after-injection is executed vary depending on the distillation property and the cetane number of the injected fuel. Bore flushing refers to a phenomenon in which the fuel injected into the cylinder flushes away lubricant that adheres to the cylinder wall surface 54, resulting in a decreased amount of fuel contributing to combustion. Note further that the combustion rate as the term is here used refers to a value of a ratio of fuel used for combustion to that injected.

More specifically, because the piston 52 leaves the top dead center when the after-injection is executed, the injected fuel is injected toward the cylinder wall surface 54 at such an angle that the fuel does not hit against the top face of the piston 52 as shown in FIG. 2(C). If a heavy fuel (having a low evaporativity) is used in this case, lack of evaporation of fuel in the cylinder results, so that fuel in droplets tends more easily to reach the cylinder wall surface 54. This increases the bore flushing amount and decreases the combustion rate. If a fuel having a low cetane number, even of a light type (having a high evaporativity), is used, fuel injected into the cylinder is not easily ignitable, so that the fuel in droplets tends more easily to reach the cylinder wall surface 54. This also results in an increased bore flushing amount and a decreased combustion rate. As such, an increased bore flushing amount or a decreased combustion rate results regardless of whether a heavy fuel or a fuel having a low cetane number is being used.

In the present embodiment, accordingly, an arrangement is made to execute a first after-injection under a relatively easily combustible condition (in which bore flushing is less likely to occur) and a second after-injection under a relatively less combustible condition (in which bore flushing is easy to occur). The cetane number and the distillation property of the fuel currently used for an operation of the internal combustion engine 10 are determined based on an amount of change (difference) in an air-fuel ratio of the exhaust gas during combustion associated with the execution of the second after-injection relative to an air-fuel ratio of the exhaust gas during combustion associated with the execution of the first after-injection, and an amount of change (difference) in a crank angular velocity during combustion associated with the execution of the second after-injection relative to a crank angular velocity during combustion associated with the execution of the first after-injection. Note that the higher a combustion pressure, the higher the crank angular velocity. The crank angular velocity is therefore used as a correlation value of the combustion pressure.

Figure 3:
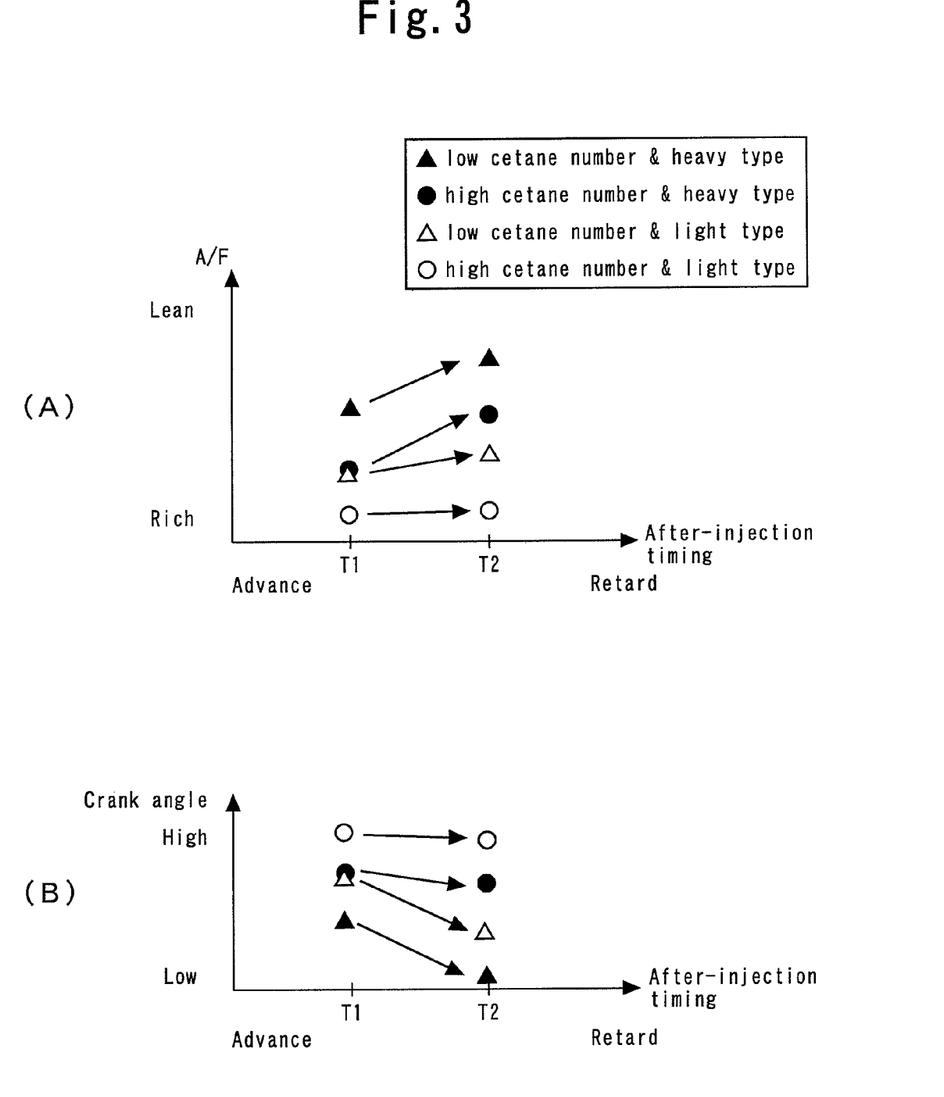
FIG. 3 is a graph for illustrating how a difference in fuel properties affects a change in the air-fuel ratio of the exhaust gas and a change in the crank angular velocity associated with a change in after injection timing.

FIG. 3 is a graph for illustrating how a difference in fuel properties affects a change in the air-fuel ratio of the exhaust gas and a change in the crank angular velocity associated with a change in after injection timing. More specifically, FIG. 3(A) shows a relationship between the air-fuel ratio of the exhaust gas and the after injection timing, and FIG. 3(B) shows a relationship between the crank angular velocity and the after injection timing. Note that fuels represented by a white circle (○) are a high cetane number, light fuel having a cetane number CN of 60 and distillation property of T90 (90% distillation temperature)=250° C.; fuels represented by a white triangle (Δ) are a low cetane number, light fuel having a cetane number CN of 40 and distillation property of T90 (90% distillation temperature)=250° C.; fuels represented by a black circle (●) are a high cetane number, heavy fuel having a cetane number CN of 60 and distillation property of T90 (90% distillation temperature)=350° C.; and fuels represented by a black triangle (▲) are a low cetane number, heavy fuel having a cetane number CN of 40 and distillation property of T90 (90% distillation temperature)=350° C.

As described earlier, the temperature and pressure in the cylinder decrease as the downward motion of the piston 52 progresses in the expansion stroke following the main combustion. As a result, a less combustible condition develops as timing to execute the after-injection is retarded. Referring to FIG. 3, consequently, timing T1 on an advance side close to the main combustion corresponds to the timing at which the first after-injection is executed and timing T2 on a retard side relative to the first after injection timing T1 corresponds to the timing at which the second after-injection is executed.

As shown in FIG. 3(A), measurements taken of the air-fuel ratio of the exhaust gas at the first after injection timing T1 show that an amount of fuel adhering to the cylinder wall surface 54 and left in the cylinder is small when the high cetane number and light fuel (○) is used, so that the air-fuel ratio of the exhaust gas indicates the richest value as the after-injection is executed. In addition, the measurements taken of the air-fuel ratio at the first after injection timing T1 show that the air-fuel ratio of the exhaust gas is leaner in the low cetane number fuel (Δ) and the heavy fuel (●) as compared with the white circle (○), as affected by bore flushing. It is further revealed that the leaner ratio is even more conspicuous in the low cetane number and heavy fuel (▲).

Additionally, a comparison made of measurements of the air-fuel ratio between the first after injection timing T1 and the second after injection timing T2 in FIG. 3(A) reveals that the measurements at the less combustible second after injection timing T2 are affected more by the cetane number or the evaporativity, changing greatly according to the properties. More specifically, it is revealed that the high cetane number and light fuel (○) is less affected by the retarding of the after injection timing, whereas the low cetane number fuel or the low evaporativity fuel is affected more by the retarding of the after injection timing. It is moreover revealed from FIG. 3(A) that the effect of the retarding of the after injection timing on the air-fuel ratio of the exhaust gas is greater in terms of whether the fuel is light or heavy (specifically, evaporativity is high or low) than in terms of whether the cetane number is high or low (specifically, ignitability is high or low).

As shown in FIG. 3(B), on the other hand, measurements taken of the crank angular velocity at the first after injection timing T1 show that, when the high cetane number and light fuel represented by the white circle (○) is used, combustion is better than when fuels of other properties are used, so that the crank angular velocity (specifically, the rate of change in the crank angle) during the after-combustion is the highest. Additionally, the measurements taken of the crank angular velocity at the first after injection timing T1 show that the crank angular velocity during the after-combustion is lower in the low cetane number fuel (Δ) and the heavy fuel (●) as compared with the white circle (○), as affected by the decreased combustion rate. It is further revealed that the lower crank angular velocity is even more conspicuous in the low cetane number and heavy fuel (▲).

Additionally, a comparison made of measurements of the crank angular velocity between the first after injection timing T1 and the second after injection timing T2 in FIG. 3(B) reveals that, as with the air-fuel ratio of the exhaust gas, the measurements at the less combustible second after injection timing T2 are affected more by the cetane number or the evaporativity, changing greatly according to the properties. More specifically, it is revealed that the high cetane number and light fuel (○) is less affected by the retarding of the after injection timing, whereas the low cetane number fuel or the low evaporativity fuel is affected more by the retarding of the after injection timing. It is moreover revealed from FIG. 3(B) that the effect of the retarding of the after injection timing on the crank angular velocity is greater in terms of whether the cetane number is high or low (specifically, ignitability is high or low) than in terms of whether the fuel is light or heavy (specifically, evaporativity is high or low).

Figure 4:
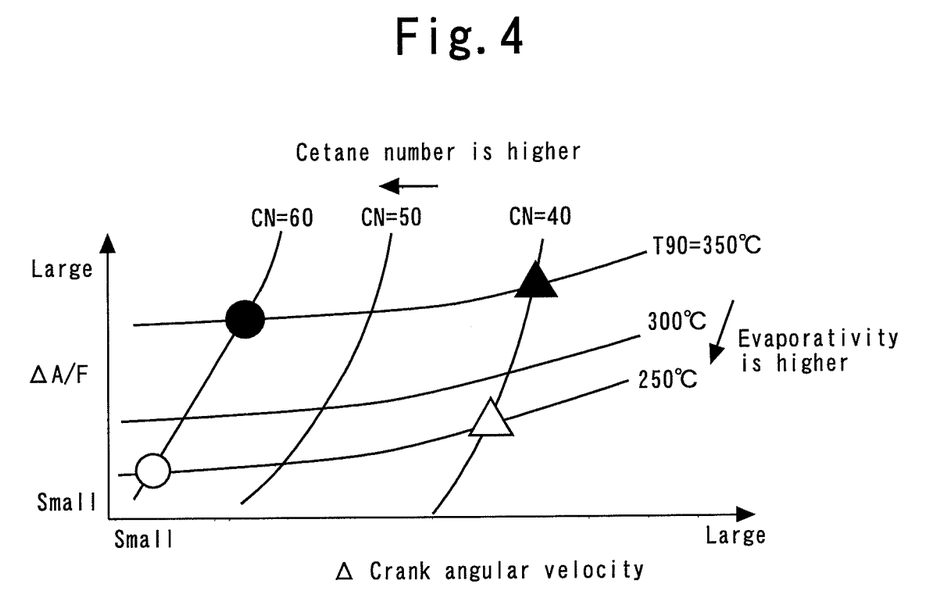
FIG. 4 is a graph showing determination basic information specifying the cetane number (CN) and the distillation property (T90) using the amount of change in the air-fuel ratio ($\Delta$ A/F) and the amount of change in the crank angular velocity ($\Delta$ crank angular velocity)

FIG. 4 is a graph showing determination basic information specifying the cetane number (CN) and the distillation property (T90) using the amount of change in the air-fuel ratio (Δ A/F) and the amount of change in the crank angular velocity (Δ crank angular velocity). More specifically, the determination basic information shown in FIG. 4 is set such that the greater the amount of change in the air-fuel ratio (Δ A/F), the higher the distillation temperature under T90, and the greater the amount of change in the crank angular velocity (Δ crank angular velocity), the lower the cetane number.

Δ A/F that is the amount of change in the air-fuel ratio between the first after injection timing T1 and the second after injection timing T2 obtained as shown in FIG. 3 and Δ crank angular velocity that is the amount of change in the crank angular velocity between first after injection timing T1 and the second after injection timing T2 obtained as shown in FIG. 3 are calculated for each of the types of fuels having the above-described four different properties and summarized to obtain a relationship as shown in FIG. 4.

In the present embodiment, the relationship as shown in FIG. 4, specifically, a relationship that specifies the cetane number (CN) and the distillation property (T90) using the amount of change in the air-fuel ratio (Δ A/F) and the amount of change in the crank angular velocity (Δ crank angular velocity) is acquired in advance. From the relationship thus acquired, a map is then prepared as the determination basic information for the fuel property and stored in advance in the ECU 40. The amount of change in the air-fuel ratio (Δ A/F) and the amount of change in the crank angular velocity (Δ crank angular velocity) are then calculated on an actual vehicle and are compared with the above-described determination basic information. The cetane number and the distillation property of the fuel currently used are thereby simultaneously and individually determined.

Figure 5:
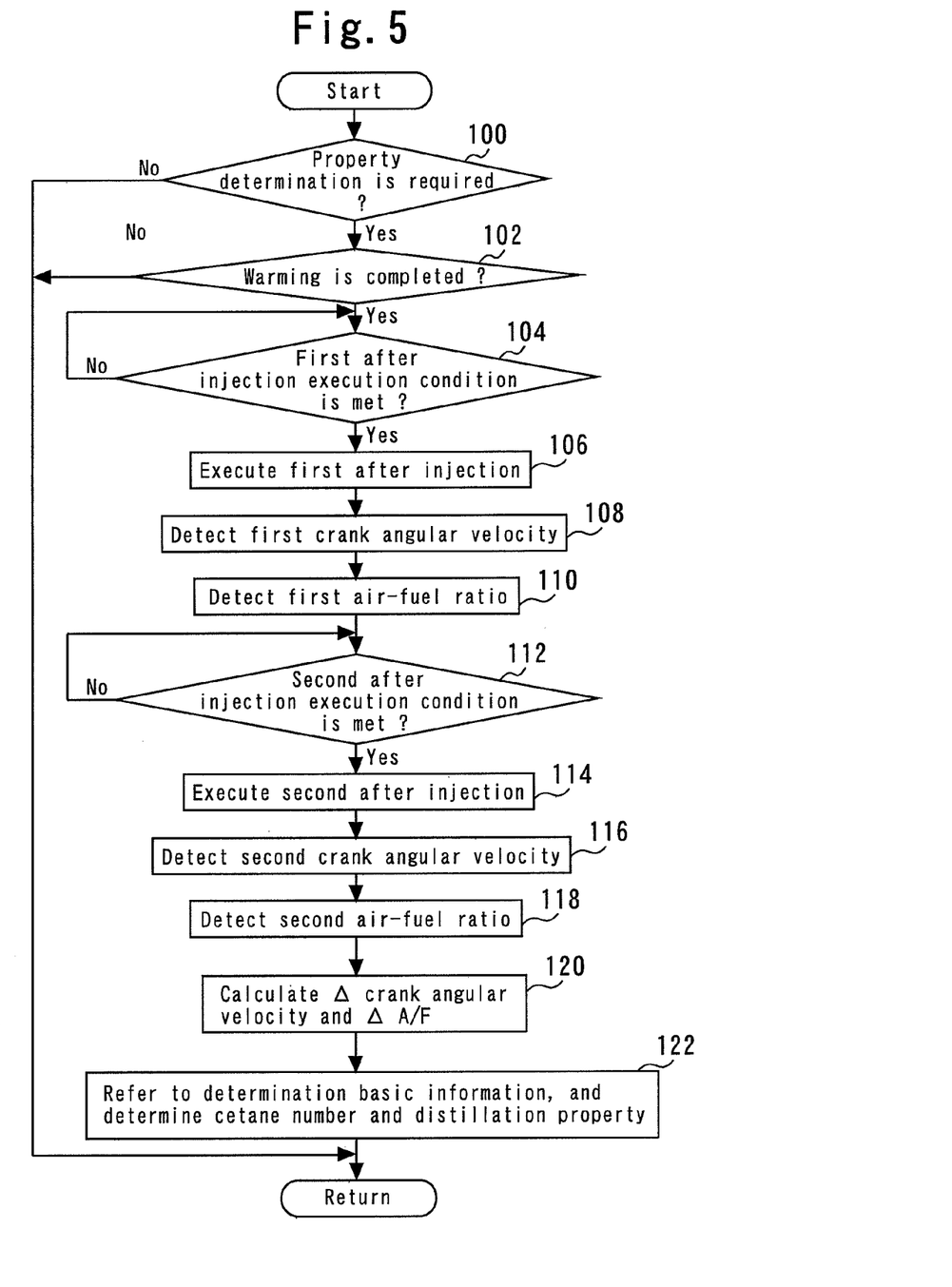
FIG. 5 is a flowchart illustrating a routine that is executed in the first embodiment of the present invention.

FIG. 5 is a flowchart showing a routine performed by the ECU 40 in the first embodiment to achieve the above-described function.

In the routine shown in FIG. 5, it is first determined whether or not fuel property determination is required (step 100). Specifically, in step 100, it is determined, as an example of determining whether or not the fuel property determination is required, whether a refueling has been performed or not. If a refueling has been performed, properties of the fuel in the fuel tank are likely to change. In step 100, therefore, if a refueling has been performed, it is determined that the fuel property determination is required. Note that whether a refueling has been performed or not can be detected by, for example, detecting a level of the fuel in the fuel tank based on an output of a level sensor (not shown).

If it is determined in step 100 that the fuel property determination is required, it is then determined whether or not warming of the internal combustion engine 10 is completed based on an output from a coolant temperature sensor (not shown) that detects an engine coolant temperature (step 102). If, as a result, the warming of the internal combustion engine 10 is completed, a fuel property determination process shown below is started.

It is first determined whether or not a predetermined first after-injection execution condition is met (step 104). The first after injection timing T1 occurs, as described earlier, after the main combustion and during the expansion stroke before the exhaust valve 48 opens, and is previously set at timing relatively near the execution of the main combustion in order to achieve the easily combustible condition (specifically, in which bore flushing is less likely to occur). The first after-injection is executed, if it is determined that the first after injection timing execution is met (step 106).

The crank angle sensor 44 is next used to detect the crank angular velocity (a first crank angular velocity) during combustion associated with the execution of fuel injection at the first after injection timing T1 (step 108). Then, the air-fuel ratio sensor 38 is used to detect the air-fuel ratio of the exhaust gas (a first air-fuel ratio) during the combustion associated with the execution of fuel injection at the first after injection timing T1 (step 110).

It is next determined, after the first after-injection and during another combustion cycle under the same operating condition, whether or not a predetermined second after injection execution condition is met (step 112). The second after injection timing T2 occurs, as described earlier, after the main combustion and during the expansion stroke before the exhaust valve 48 opens, and is previously set at on a retard side relative to the first after injection timing T1 in order to achieve the less combustible condition (specifically, in which bore flushing tends to occur). To add further, the after injection timings T1, T2 are supposed to be timing at which combustion is possible when a predetermined standard fuel (e.g. light oil) is used.

The second after-injection is executed, if it is determined in step 112 that the second after injection execution condition is met (step 114). The crank angle sensor 44 is then used to detect the crank angular velocity (a second crank angular velocity) during combustion associated with the execution of fuel injection at the second after injection timing T2 (step 116). Then, the air-fuel ratio sensor 38 is used to detect the air-fuel ratio of the exhaust gas (a second air-fuel ratio) during the combustion associated with the execution of fuel injection at the second after injection timing T2 (step 118).

Next, Δ crank angular velocity that is an amount of change (difference) between the first crank angular velocity and the second crank angular velocity and Δ A/F that is an amount of change (difference) between the first air-fuel ratio and the second air-fuel ratio are calculated (step 120). The determination basic information (the relation as shown in FIG. 4) of the fuel properties is then referred to and the current Δ crank angular velocity and Δ A/F are applied to the determination basic information, thereby determining the cetane number and the distillation property of the fuel (step 122).

According to the routine shown in FIG. 5 as described above, the air-fuel ratio and the crank angular velocity during the combustion associated with the execution of each after-injection at each of the first and second after injection timings T1, T2 are detected. Unlike such a technique, with measurements of the air-fuel ratio at only one point of the first after injection timing T1, it is not possible to determine whether the low cetane number or the heavy type is responsible for the leaner air-fuel ratio, as is known from the white triangle (Δ) and the black circle (●) of FIG. 3(A). Further, with measurements of the crank angular velocity at only one point of the first after injection timing T1, it is not possible to determine whether the low cetane number or the heavy type is responsible for determining whether the crank angular velocity is high or low, as is known from the white triangle (Δ) and the black circle (●) of FIG. 3(B).

In contrast, as by the processes of the above-described routine, the calculation of the amount of change in the air-fuel ratio Δ A/F using the two after injection timings T1, T2 allows an index, in which an effect from the evaporativity of the fuel is incorporated more than that from the cetane number of the fuel, to be obtained as is known from the measurements shown in FIG. 3(A). This allows the effect from the evaporativity of the fuel to be clearly identified based on Δ A/F. Further, the calculation of the Δ crank angular velocity using the two after injection timings T1, T2 allows an index, in which the effect from the cetane number of the fuel is incorporated more than that from the evaporativity of the fuel, to be obtained as is known from the measurements shown in FIG. 3(B). This allows the effect from the cetane number of the fuel to be clearly identified based on the Δ crank angular velocity.

It is, however, difficult to specify accurately the cetane number and the distillation property with a technique using only either Δ A/F or Δ crank angular velocity. More specifically, use of only Δ A/F as against the determination basic information as shown in FIG. 4 does not allow the effect from the cetane number of the fuel to be clearly identified, so that the distillation property can be specified only with low accuracy of a value falling within a certain range. Similarly, use of only Δ crank angular velocity as against the determination basic information as shown in FIG. 4 does not allow the effect from the evaporativity of the fuel to be clearly identified, so that the cetane number can be specified only with low accuracy of a value falling within a certain range. In contrast, the technique of the above-described routine determines by using both Δ A/F and Δ crank angular velocity, so that the cetane number and the distillation property can be simultaneously and individually determined (specified) with high accuracy by using the above determination basic information.

As described above, the cetane number (ignitability index value) greatly affects the crank angular velocity (combustion pressure) and the distillation property (evaporativity index value) greatly affects the air-fuel ratio of the exhaust gas. In accordance with the fuel property determination technique of the present embodiment, the cetane number and the distillation property of the fuel can be simultaneously and individually determined with high accuracy using the crank angular velocity and the air-fuel ratio at the different injection timings T1, T2 during the after-combustion that is easily affected by the ignitability and evaporativity of the fuel.

In the first embodiment, which has been described above, to determine the fuel property, the first after-injection and the second after-injection are executed during the expansion stroke after the main combustion. The first injection timing in the present invention is not, however, limited only to the first after injection timing T1. Specifically, if the fuel injection for the main combustion is executed at any injection timing after the top dead center on the compression stroke, the first injection timing may be the injection timing in question for the main combustion. Similarly, in conjunction therewith, the second injection timing in the present invention may be the after injection timing executed during the expansion stroke after the abovementioned injection timing for the main combustion after the top dead center on the compression stroke, and not the second after injection timing T2.

Additionally, in the first embodiment, which has been described above, the crank angular velocity detected by the crank angle sensor 44 is used to acquire a correlation value of the combustion pressure during the after-combustion. The technique for acquiring the combustion pressure or the correlation value thereof in the present invention is not, however, limited only to the foregoing; specifically, for example, a cylinder pressure sensor for detecting the cylinder pressure of the internal combustion engine 10 may be provided to acquire the combustion pressure during the after-combustion.

Additionally, in the first embodiment, which has been described above, the after-injection for determining fuel properties is executed at the two points of the first after injection timing T1 and the second after injection timing T2.

The second after injection timing in the present invention is not, however, limited only to the example having one point of the timing T2. A technique to be described below may, for example, be implemented. Specifically, the second after injection timing having a relatively small retard amount relative to the first after injection timing is first set in consideration of inhibition of the bore flushing amount. If Δ A/F or Δ crank angular velocity of a magnitude required for achieving sufficient accuracy in property determination is not obtained from the second after injection timing set as described above, the second after injection timing is retarded further to execute after-injection at a third point.

Additionally, in the first embodiment, which has been described above, the distillation property (T90) is used as the evaporativity index value. The evaporativity index value in the present invention is not, however, limited only to the distillation property; specifically, kinematic viscosity of the fuel may, for example, be used. Fuel tends to be easily atomized at lowering kinematic viscosity, resulting in a higher evaporativity of the fuel. The kinematic viscosity may therefore be used as the evaporativity index value.

Additionally, in the first embodiment, which has been described above, to determine fuel properties, Δ A/F that is the amount of change (difference) between the first air-fuel ratio and the second air-fuel ratio or Δ crank angular velocity that is the amount of change (difference) between the first crank angular velocity and the second crank angular velocity is calculated. The information on changes that serve as first and second determination indices in the present invention is not, however, limited only to the foregoing; specifically, a rate (ratio) of change between the first air-fuel ratio and the second air-fuel ratio or a rate (ratio) of change between the first crank angular velocity and the second crank angular velocity may, for example, be used.

Incidentally, in the first embodiment, which has been described above, the "first injection execution means" according to the first aspect of the present invention is implemented when the ECU 40 performs above-described step 106; the "second injection execution means" according to the first aspect of the present invention is implemented when the ECU 40 performs above-described step 114; the "combustion pressure acquisition means" according to the first aspect of the present invention is implemented when the ECU 40 performs above-described steps 108 and 116; the "air-fuel ratio acquisition means" according to the first aspect of the present invention is implemented when the ECU 40 performs above-described steps 110 and 118; and the "fuel property determination means" according to the first aspect of the present invention is implemented when the ECU 40 performs above-described steps 108 and 116. In addition, the first after injection timing T1 and the second after injection timing correspond to the "first injection timing" and the "second injection timing", respectively, according to the first aspect of the present invention.

Additionally, in the first embodiment, which has been described above, Δ crank angular velocity corresponds to the "first determination index" according to the second aspect of the present invention; and Δ A/F corresponds to the "second determination index" according to the second aspect of the present invention. In addition, the "first determination index calculation means" and "second determination index calculation means" according to the second aspect of the present invention are implemented when the ECU 40 performs above-described step 120; and the "determination basic information acquisition means" and "determination execution means" according to the second aspect of the present invention are implemented when the ECU 40 performs above-described step 122.

Second Embodiment

A second embodiment of the present invention will be described below with reference to FIGS. 6 through 8.

A system according to the present embodiment can be realized by letting an ECU 40 perform a routine shown in FIG. 6 to be described later instead of the routine shown in FIG. 5 using the hardware configuration shown in FIG. 1.

[Characteristic Portions of the Second Embodiment]

In the first embodiment described earlier, the after-injection is executed at the predetermined after injection timings T1, T2. The system in the present embodiment, on the other hand, is characterized in that a second after injection timing T2 is set based on a value of the air-fuel ratio (a first air-fuel ratio) of the exhaust gas during a first after injection at a predetermined first after injection timing T1.

Figure 6:
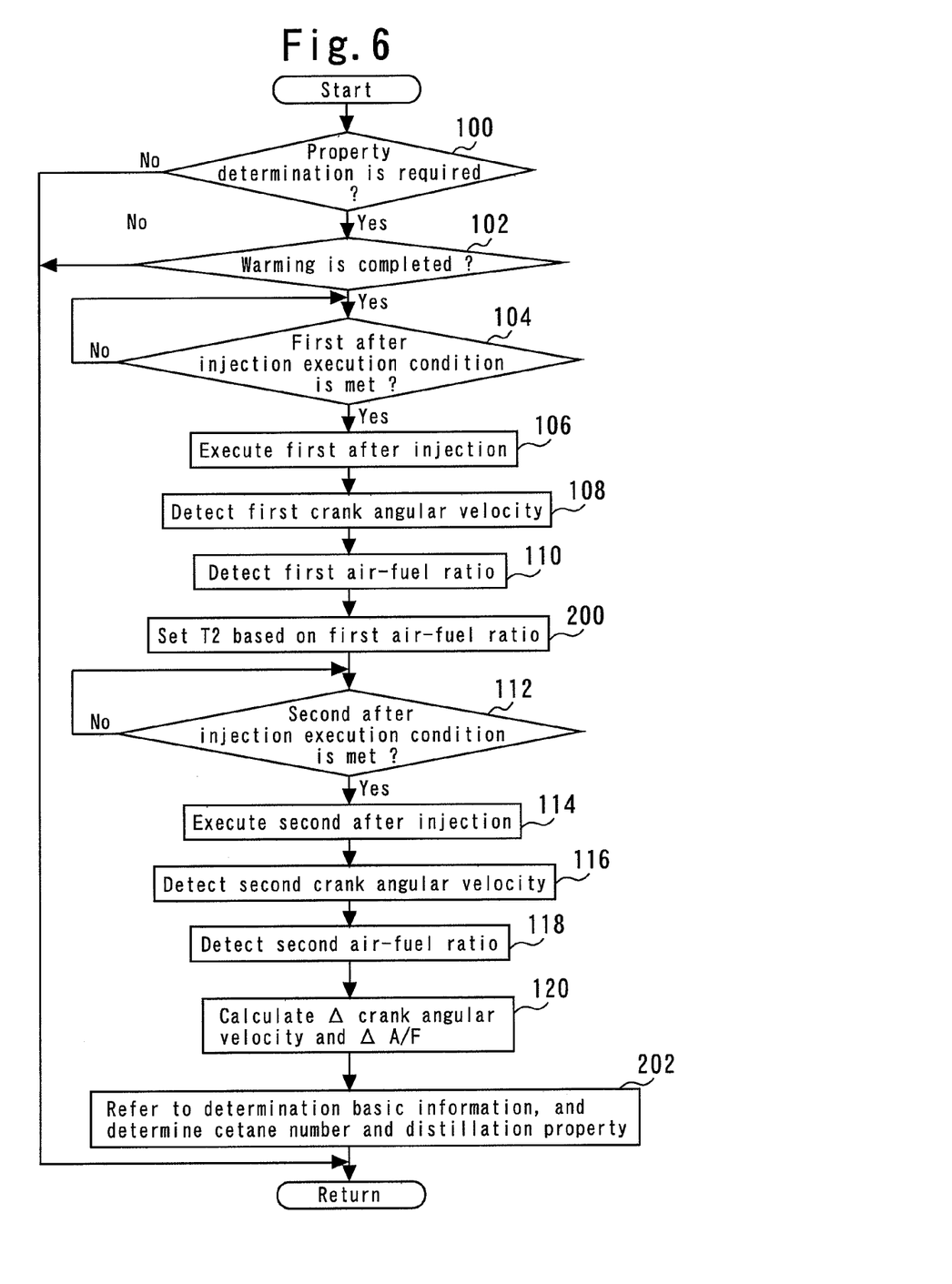
FIG. 6 is a flowchart illustrating a routine that is executed in the second embodiment of the present invention.
Figure 7:
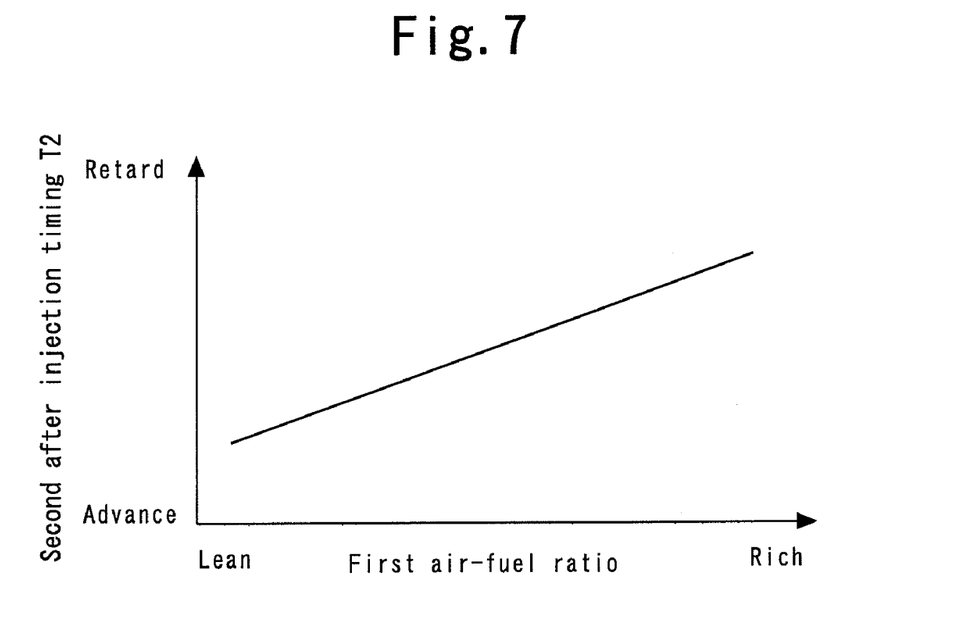
FIG. 7 is a graph showing a tendency of a map referenced in the routine shown in FIG. 6.

FIG. 6 is a flowchart showing a routine performed by the ECU 40 in the second embodiment to achieve the above-described function. Note that, in FIG. 6, the same steps as those in FIG. 5 in the first embodiment will be assigned with the same numbers and the descriptions therefor will be omitted or simplified.

In the routine shown in FIG. 6, after the air-fuel ratio of the exhaust gas (the first air-fuel ratio) during the combustion associated with the execution of the first after-injection is detected in the above step 110, the second after injection timing T2 is then set based on this first air-fuel ratio (step 200).

Specifically, the ECU 40 stores therein a map that specifies the second after injection timing T2 relative to the first air-fuel ratio. FIG. 7 is a graph showing a tendency of such a map. Specifically, in FIG. 7, the leaner the value of the first air-fuel ratio, the smaller the retard amount set for the second after injection timing T2 relative to the first after injection timing T1. In step 200, such a map is referred to and the second after injection timing T2 is determined based on the first air-fuel ratio.

If the second after injection execution condition set in step 200 is met after the execution of the first after-injection and during another cycle under the same operating condition (step 112), the second after-injection is executed (step 114) and the second air-fuel ratio and the second crank angular velocity are detected (steps 116 and 118).

After Δ crank angular velocity and Δ A/F are calculated (step 120), determination basic information (the relationship as shown in FIG. 4) of the fuel property corresponding to the second after injection timing T2 set in step 200 is referred to and the cetane number and the distillation property of the fuel are determined based on the current Δ crank angular velocity and Δ A/F (step 202). Note that, because the second after injection timing T2 is varied according to the first after injection timing T1 in this routine, the above-referenced determination basic information is provided as a plurality of maps for each second after injection timing T2 to be changed.

As described heretofore, according to the routine shown in FIG. 6, the second after injection timing T2 is set based on the air-fuel ratio (the first air-fuel ratio) during the combustion associated with the execution of the first after-injection. If the value of the first air-fuel ratio is leaner than when a predetermined standard fuel is used, it can be determined that a fuel with which bore flushing tends more easily to occur is being used. It can therefore be determined that the amount of change in the air-fuel ratio Δ A/F becomes greater as the after injection timing is retarded more. According to the processes of the above routine, the retard amount of the second after injection timing T2 relative to the first after injection timing T1 is made small in such a case. This prevents the second after injection timing T2 from being uselessly retarded, thereby inhibiting the bore flushing amount and achieving a sufficiently large Δ A/F required for ensuring accuracy in determining the fuel property.

If the value of the first air-fuel ratio is richer than when the predetermined standard fuel is used, it can be determined that a fuel with which bore flushing is less likely to occur is being used. It can therefore be determined that the amount of change in the air-fuel ratio Δ A/F becomes smaller as the after injection timing is retarded more. According to the processes of the above routine, the retard amount of the second after injection timing T2 relative to the first after injection timing T1 is made large in such a case. This achieves a sufficiently large Δ A/F required for ensuring accuracy in determining the fuel property. Note that, in such a case, the bore flushing is relatively less likely to occur, so that there is less concern about an increased bore flushing amount even when the retard amount of the second after injection timing T2 is made larger, as compared with the case in which the value of the first air-fuel ratio is lean.

In the second embodiment, which has been described above, the second after injection timing T2 is set based on the air-fuel ratio of the exhaust gas (the first air-fuel ratio) during the combustion associated with the execution of the first after-injection. The present invention is not, however, limited only to such a technique; specifically, the second after injection timing T2 may be set based on the crank angular velocity (the first crank angular velocity) during the combustion associated with the execution of the first after-injection in place of the first air-fuel ratio. Such a technique may be achieved by letting the ECU 40 perform processes of a routine similar to the routine shown in FIG. 6.

Figure 8:
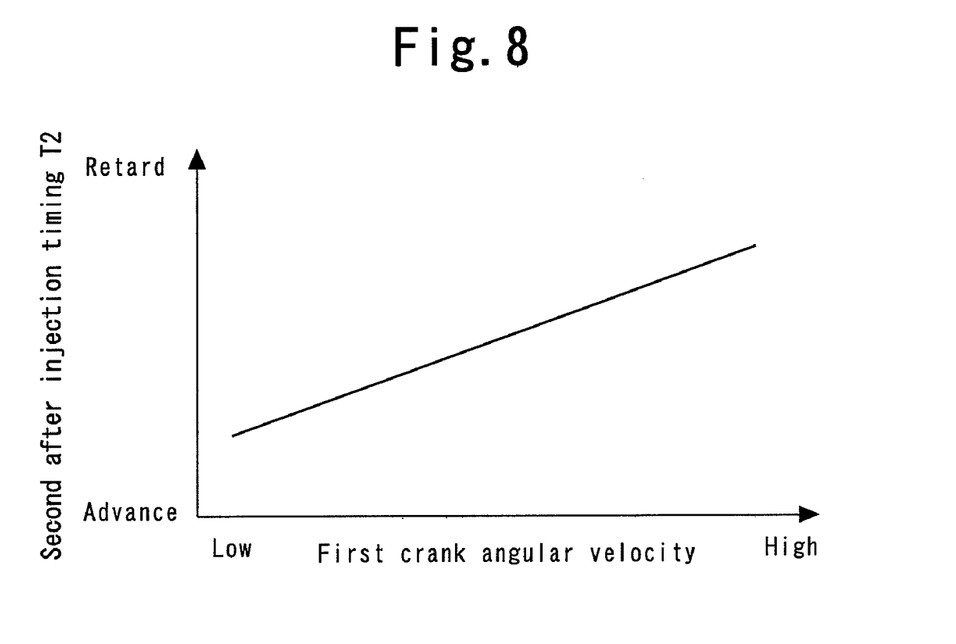
FIG. 8 is a graph showing a tendency of a map referenced in a modified embodiment associated with the second embodiment of the present invention.

More specifically, in a step similar to step 200, a process is performed to set the second after injection timing T2 based on the first crank angular velocity according to a map showing a tendency as shown in FIG. 8 below. In FIG. 8, the second after injection timing T2 is set such that the retard amount relative to the first after injection timing T1 is smaller at lower values of the first crank angular velocity.

If the value of the first crank angular velocity is lower than when a predetermined standard fuel is used, it can be determined that a fuel with which bore flushing tends more easily to occur is being used. It can therefore be determined that the amount of change in the crank angular velocity, Δ crank angular velocity, becomes greater as the after injection timing is retarded more. According to the tendency of the map shown in FIG. 8, the retard amount of the second after injection timing T2 relative to the first after injection timing T1 is made small in such a case. This prevents the second after injection timing T2 from being uselessly retarded, thereby inhibiting the bore flushing amount and achieving a sufficiently large Δ crank angular velocity required for ensuring accuracy in determining the fuel property.

If the value of the first crank angular velocity is higher than when the predetermined standard fuel is used, it can be determined that a fuel which has a high combustion rate and with which bore flushing is less likely to occur is being used. It can therefore be determined that the amount of change in the crank angular velocity, Δ crank angular velocity, becomes smaller as the after injection timing is retarded more. According to the tendency of the map shown in FIG. 8, the retard amount of the second after injection timing T2 relative to the first after injection timing T1 is made large in such a case. This achieves a sufficiently large Δ crank angular velocity required for ensuring accuracy in determining the fuel property. Note that, in such a case, the bore flushing is relatively less likely to occur, so that there is less concern about an increased bore flushing amount even when the retard amount of the second after injection timing T2 is made larger, as compared with the case in which the value of the first crank angular velocity is low.

Incidentally, in the second embodiment, which has been described above, the "second injection timing setting means" according to the fourth aspect of the present invention is implemented when the ECU 40 performs above-described step 200.

The invention claimed is:

1. A fuel property determination apparatus for an internal combustion engine, the apparatus comprising:
   a fuel injection valve for injecting fuel into a cylinder;
   first injection execution means for executing fuel injection using the fuel injection valve at a first injection timing during an expansion stroke;
   second injection execution means for executing fuel injection using the fuel injection valve at at least one second injection timing during the expansion stroke, the second injection timing being retarded from the first injection timing, while a combustion cycle proceeds unlike that when the fuel injection at the first injection timing is performed;
   combustion pressure acquisition means for detecting or estimating a combustion pressure or a correlation value thereof;
   air-fuel ratio acquisition means for acquiring an air-fuel ratio of an exhaust gas; and
   fuel property determination means for determining a fuel property based on a combustion pressure during combustion each associated with the fuel injection at the first injection timing and the second injection timing or a correlation value thereof, and an air-fuel ratio of an exhaust gas during combustion each associated with the fuel injection at the first injection timing and the second injection timing.

2. The fuel property determination apparatus for the internal combustion engine according to claim 1,
   wherein the fuel property determination means includes:
   first determination index calculation means for calculating, as a first determination index, information on a change of the combustion pressure during combustion associated with the fuel injection at the second injection timing or the correlation value thereof relative to the combustion pressure during combustion associated with the fuel injection at the first injection timing or the correlation value thereof;
   second determination index calculation means for calculating, as a second determination index, information on a change of the air-fuel ratio during combustion associated with the fuel injection at the second injection timing relative to the air-fuel ratio during combustion associated with the fuel injection at the first injection timing;
   determination basic information acquisition means for acquiring determination basic information that specifies a fuel ignitability index value and a fuel evaporativity index value using the first determination index and the second determination index; and
   determination execution means for determining the ignitability index value and the evaporativity index value according to the first determination index, the second determination index, and the determination basic information.

3. The fuel property determination apparatus for the internal combustion engine according to claim 2,
   wherein the first determination index is a change amount of the combustion pressure during combustion associated with the fuel injection at the second injection timing or the correlation value thereof relative to the combustion pressure during combustion associated with the fuel injection at the first injection timing or the correlation value thereof;
   wherein the second determination index is a change amount of the air-fuel ratio during combustion associated with the fuel injection at the second injection timing relative to the air-fuel ratio during combustion associated with the fuel injection at the first injection timing; and
   wherein the determination basic information is set such that, the greater the first determination index, the lower the ignitability indicated by the ignitability index value, and the greater the second determination index, the lower the evaporativity indicated by the evaporativity index value.

4. The fuel property determination apparatus for the internal combustion engine according to claim 1, the apparatus further comprising:
   second injection timing setting means for setting the second injection timing based on at least one of the combustion pressure during combustion associated with the fuel injection at the first injection timing and the correlation value thereof, or the air-fuel ratio during combustion associated with the fuel injection at the first injection timing.

5. The fuel property determination apparatus for the internal combustion engine according to claim 4,
   wherein the second injection timing setting means makes a setting such that the leaner a value of the air-fuel ratio during combustion associated with the fuel injection at the first injection timing, the smaller a retard amount of the second injection timing relative to the first injection timing.

6. The fuel property determination apparatus for the internal combustion engine according to claim 4,
   wherein the second injection timing setting means makes a setting such that the smaller the combustion pressure during combustion associated with the fuel injection at the first injection timing or the correlation value thereof, the smaller a retard amount of the second injection timing relative to the first injection timing.

7. The fuel property determination apparatus for the internal combustion engine according to claim 1,
   wherein the correlation value of the combustion pressure is a measured value of a crank angular velocity.

8. A fuel property determination apparatus for an internal combustion engine, the apparatus comprising:
   a fuel injection valve for injecting fuel into a cylinder;
   a first injection execution device for executing fuel injection using the fuel injection valve at a first injection timing during an expansion stroke;
   a second injection execution device for executing fuel injection using the fuel injection valve at at least one second injection timing during the expansion stroke, the second injection timing being retarded from the first injection timing, while a combustion cycle proceeds unlike that when the fuel injection at the first injection timing is performed;
   a combustion pressure acquisition device for detecting or estimating a combustion pressure or a correlation value thereof;

an air-fuel ratio acquisition device for acquiring an air-fuel ratio of an exhaust gas; and a fuel property determination device for determining a fuel property based on a combustion pressure during combustion each associated with the fuel injection at the first injection timing and the second injection timing or a correlation value thereof, and an air-fuel ratio of an exhaust gas during combustion each associated with the fuel injection at the first injection timing and the second injection timing.

* * * * *